United States Patent
Wu

(10) Patent No.: US 11,959,748 B2
(45) Date of Patent: Apr. 16, 2024

(54) FUNCTIONAL ITERATIVE INTEGRATION-BASED METHOD AND SYSTEM FOR INERTIAL NAVIGATION SOLUTION

(71) Applicant: SHANGHAI JIAO TONG UNIVERSITY, Shanghai (CN)

(72) Inventor: Yuanxin Wu, Shanghai (CN)

(73) Assignee: SHANGHAI JIAO TONG UNIVERSITY, Shanghai (CN)

(*) Notice: Subject to any disclaimer, the term of this patent is extended or adjusted under 35 U.S.C. 154(b) by 814 days.

(21) Appl. No.: 17/040,062

(22) PCT Filed: Dec. 29, 2018

(86) PCT No.: PCT/CN2018/125317
§ 371 (c)(1),
(2) Date: Sep. 22, 2020

(87) PCT Pub. No.: WO2020/124678
PCT Pub. Date: Jun. 25, 2020

(65) Prior Publication Data
US 2021/0025711 A1    Jan. 28, 2021

(30) Foreign Application Priority Data
Dec. 19, 2018 (CN) .......................... 201811558766.6

(51) Int. Cl.
G01C 21/16 (2006.01)
G01C 19/00 (2013.01)
G01P 15/00 (2006.01)

(52) U.S. Cl.
CPC ........... G01C 21/188 (2020.08); G01C 19/00 (2013.01); G01P 15/00 (2013.01)

(58) Field of Classification Search
CPC .............................. G01C 19/00; G01P 15/00
(Continued)

(56) References Cited

U.S. PATENT DOCUMENTS 4,675,820 A * 6/1987 Smith ................. G01C 21/188
                                                       73/178 R
5,527,003 A * 6/1996 Diesel .................... G05D 1/101
                                                       244/76 R
(Continued)

FOREIGN PATENT DOCUMENTS

| CA | 2246974 A1 * | 10/1999 | ............. G01C 21/16 |
| EP | 1637840 A1 * | 3/2006 | ............. G01C 21/16 |
| WO | WO-2012112908 A2 * | 8/2012 | ............. G01C 21/16 |

OTHER PUBLICATIONS

Zhen et al., "Study of independent initial alignment based on gyroscope free strapdown inertial navigation system," 2010, Publisher: IEEE.*
(Continued)

*Primary Examiner* — Tuan C To
(74) *Attorney, Agent, or Firm* — Bayramoglu Law Offices LLC

(57) ABSTRACT

A functional iterative integration-based method for an inertial navigation solution includes: fitting a Chebyshev polynomial function of an angular velocity and a Chebyshev polynomial function of a specific force according to gyroscope-measured values and accelerometer-measured values on a time interval; iteratively calculating Chebyshev polynomial coefficients of an attitude quaternion by using the obtained Chebyshev polynomial coefficients of the angular velocity and an integral equation of the attitude quaternion, and performing polynomial truncation on a result obtained from each iterative calculation according to a preset order; iteratively calculating Chebyshev polynomial coefficients of a velocity/position by using the obtained Chebyshev polynomial coefficients of the specific force, the Chebyshev polynomial coefficients of the attitude quaternion and an integral equation of the velocity/position, and performing polynomial truncation on a result obtained from each itera-
(Continued)

tive calculation according to a preset order; and obtaining attitude/velocity/position information on the corresponding time interval.

8 Claims, 1 Drawing Sheet

(58) Field of Classification Search
USPC .................................................. 701/500
See application file for complete search history.

(56) References Cited

U.S. PATENT DOCUMENTS

| | | | | |
|---|---|---|---|---|
| 5,828,980 | A * | 10/1998 | Tazartes | G01C 21/188 702/93 |
| 6,175,807 | B1 * | 1/2001 | Buchler | G01C 21/183 701/534 |
| 6,219,616 | B1 * | 4/2001 | Litmanovich | G01C 21/188 701/512 |
| 6,856,897 | B1 * | 2/2005 | Phuyal | G06F 16/29 701/461 |
| 8,185,261 | B2 * | 5/2012 | Patera | B64G 1/244 701/4 |
| 9,534,900 | B2 * | 1/2017 | Qi | G01C 21/18 |
| 2003/0036847 | A1 * | 2/2003 | Geier | G01C 21/28 701/472 |
| 2011/0238307 | A1 * | 9/2011 | Psiaki | G01C 21/28 701/469 |
| 2014/0121963 | A1 * | 5/2014 | Buck | G01C 21/188 701/535 |
| 2014/0309836 | A1 * | 10/2014 | Ollis | B60W 30/00 701/25 |
| 2015/0316383 | A1 * | 11/2015 | Donikian | G01C 21/165 701/408 |
| 2017/0336208 | A1 * | 11/2017 | Korogi | G01C 21/08 |

OTHER PUBLICATIONS

Sou-Chen et al., "Innovative estimation method with measurement likelihood for all-accelerometer type inertial navigation system," 2002, vol. 38, Publisher: IEEE.*

Wu, Yuanxin. "RodFIter: Attitude Reconstruction from Inertial Measurement by Functional Iteration" IEEE Transactions on Aerospace and Electronic Systems, vol. 54, No. 5, Oct. 10, 2018(Oct. 10, 2018), ISSN:0018-9251, pp. 2131-2142.

* cited by examiner

FUNCTIONAL ITERATIVE INTEGRATION-BASED METHOD AND SYSTEM FOR INERTIAL NAVIGATION SOLUTION

CROSS REFERENCE TO THE RELATED APPLICATIONS

This application is the national phase entry of International Application No. PCT/CN2018/125317, filed on Dec. 29, 2018, which is based upon and claims priority to Chinese Patent Application No. 201811558766.6, filed on Dec. 19, 2018, the entire contents of which are incorporated herein by reference.

TECHNICAL FIELD

The present invention relates to the technical fields of inertial navigation and robotics, and more particularly, to a functional iterative integration-based method and system for inertial navigation solution.

BACKGROUND

The accuracy in calculation or estimation of rigid body motion in three-dimensional space is a critical problem in numerous fields such as physics, robotics, navigation and guidance, machinery, and computer vision. In inertial navigation, information on angular velocity and acceleration is measured by gyroscopes and accelerometers, and then integrated to obtain information on attitude, velocity and position. Inertial navigation has the advantage of being rich in motion information and having a fully autonomous work process without the aid of external information. Inertial navigation is favored especially in applications where satellite navigation signals are interrupted or deceived caused by interference, and typically used as the core navigation information source for various motion platforms.

At present, the algorithms for a majority of inertial navigation systems have two significant shortcomings, 1) principle defect, associated with the inertial navigation algorithm uses an approximation to the theoretical equation, for example, the attitude algorithm uses a simplified rotation vector, and the velocity algorithm uses the first-order approximation of attitude; 2) algorithmic defect associated with the inertial navigation algorithm parameters are designed in special motion situations, such as coning motion or swing motion, and thus cannot ensure the optimality in actual motion.

In view of the above-mentioned problems of the attitude algorithms, Chinese Patent CN 201710273489.3 proposes a Functional Iterative Integration-Based Method For Rigid Body Attitude Solution, which includes: fitting a polynomial function of an angular velocity according to gyroscope-measured values on a time interval; iteratively calculating a Rodrigues vector by using the fitted polynomial function of the angular velocity and an integral equation of the Rodrigues vector; and acquiring an attitude change in a form of quaternion on the time interval according to a result obtained from the iterative calculation. This method has the advantage of high calculation accuracy, but does not fully exploit the good properties of the Chebyshev polynomials in the iterative calculation process. Moreover, the polynomial order of the Rodrigues vector increases sharply along with the iterative calculation process, causes a large computational burden, which is difficult to meet real-time applications. In this regard, Chinese Patent CN 201810236436.9 proposes a Functional Iterative Integration-Based Fast Calculation Method And System For Rigid Body Attitude Solution. This fast algorithm uses the fitted Chebyshev polynomial coefficients of the angular velocity and the Rodrigues vector integral equation to iteratively calculate the Chebyshev polynomial coefficients of the Rodrigues vector, and performs polynomial truncation on the result obtained from each iterative calculation according to the preset order, which significantly improves the calculation efficiency. The aforementioned two invention patents have satisfactorily solved the problem of high-accuracy attitude solution in the inertial navigation solution algorithm.

However, an effective approach to solving the above-mentioned shortcomings in the velocity and position solution remains absent in the prior art.

SUMMARY

In view of the above-mentioned shortcomings in the prior art, an objective of the present invention is to provide a functional iterative integration-based method and system for inertial navigation solution.

According to the present invention, a functional iterative integration-based method for inertial navigation solution includes:
a fitting step: fitting a Chebyshev polynomial function of an angular velocity and a Chebyshev polynomial function of a specific force according to gyroscope-measured values and accelerometer-measured values on a time interval;
an attitude iterative solution step: iteratively calculating Chebyshev polynomial coefficients of an attitude quaternion by using the obtained Chebyshev polynomial coefficients of the angular velocity and an integral equation of the attitude quaternion, and performing polynomial truncation on a result obtained from each iterative calculation according to a preset order;
a velocity/position iterative solution step: iteratively calculating Chebyshev polynomial coefficients of a velocity/position by using the obtained Chebyshev polynomial coefficients of the specific force, the Chebyshev polynomial coefficients of the attitude quaternion and an integral equation of the velocity/position, and performing polynomial truncation on a result obtained from each iterative calculation according to a preset order; and
an attitude/velocity/position acquisition step: obtaining attitude/velocity/position information on the corresponding time interval according to the obtained Chebyshev polynomial coefficients of the attitude/velocity/position and the corresponding Chebyshev polynomial.

Preferably, the gyroscope-measured values include a measured value of the angular velocity or a measured value of an angular increment, and the accelerometer-measured values include a measured value of the specific force or a measured value of a velocity increment.

Preferably, in the fitting step, the time interval is divided into at least two sub-time intervals to perform sequential calculations.

Preferably, in the attitude iterative solution step or the velocity/position iterative solution step, the iterative calculation is performed until the maximum number of iterative calculations is reached or a predetermined convergence condition is satisfied.

Preferably, the method further includes:

a navigation step: performing a navigation according to the attitude/velocity/position information on the corresponding time interval.

A functional iterative integration-based system for inertial navigation solution according to the present invention includes:

a fitting module, configured to fit a Chebyshev polynomial function of an angular velocity and a Chebyshev polynomial function of a specific force according to gyroscope-measured values and accelerometer-measured values on a time interval;

an attitude iterative solution module, configured to iteratively calculate Chebyshev polynomial coefficients of an attitude quaternion by using the obtained Chebyshev polynomial coefficients of the angular velocity and an integral equation of the attitude quaternion, and perform polynomial truncation on a result obtained from each iterative calculation according to a preset order;

a velocity/position iterative solution module, configured to iteratively calculate Chebyshev polynomial coefficients of a velocity/position by using the obtained Chebyshev polynomial coefficients of the specific force, the Chebyshev polynomial coefficients of the attitude quaternion and an integral equation of the velocity/position, and perform polynomial truncation on a result obtained from each iterative calculation according to a preset order; and an attitude/velocity/position acquisition module, configured to obtain attitude/velocity/position information on the corresponding time interval according to the obtained Chebyshev polynomial coefficients of the attitude/velocity/position and the corresponding Chebyshev polynomial.

Preferably, the gyroscope-measured values include a measured value of the angular velocity or a measured value of an angular increment, and the accelerometer-measured values include a measured value of the specific force or a measured value of a velocity increment.

Preferably, the fitting module divides the time interval into at least two sub-time intervals to perform sequential calculations.

Preferably, the attitude iterative solution module and the velocity/position iterative solution module perform the iterative calculation until the maximum number of iterative calculations is reached or a predetermined convergence condition is satisfied.

Preferably, the system further includes:

a navigation module, configured to perform a navigation according to the attitude/velocity/position information on the corresponding time interval.

Compared with the prior art, the present invention has the following advantages:

Based on the functional iterative integration and Chebyshev polynomial approximation techniques, the angular velocity and the specific force are reconstructed by means of fitting according to the gyroscope-measured information and accelerometer-measured information, and precise integral calculation of kinematics equations with respect to attitude, velocity and position is performed by a functional iterative integration approach. The iterative calculation process employs the Chebyshev polynomials with good numerical characteristics, whereby the iterative integrals of attitude, velocity and position are converted into iterative calculations of the corresponding Chebyshev polynomial coefficients. The calculation speed is increased by an order truncation method without significantly reducing the calculation accuracy, and the noncommutative errors caused by motion, such as an attitude coning error, a velocity swing error and a position scrolling error, are effectively eliminated.

BRIEF DESCRIPTION OF THE DRAWING

Other features, objectives and advantages of the present invention will be clearly described with reference to the detailed description of the non-restrictive embodiments and the drawing.

DETAILED DESCRIPTION OF THE EMBODIMENTS

The present invention will be described in detail below with reference to the specific embodiments. The following embodiments will help those skilled in the art to further understand the present invention, but should not be construed as limiting the present invention in any form. It should be noted that for those having ordinary skill in the art, several changes and improvements can be made without departing from the concept of the present invention. These changes and improvements shall fall within the scope of protection of the present invention.

The functional iterative integration-based method for inertial navigation solution provided by the present invention can select different calculation reference coordinate systems. In consideration of the computational burden, the present invention uses the earth coordinate system as the calculation reference coordinate system for illustration.

Figure 1:
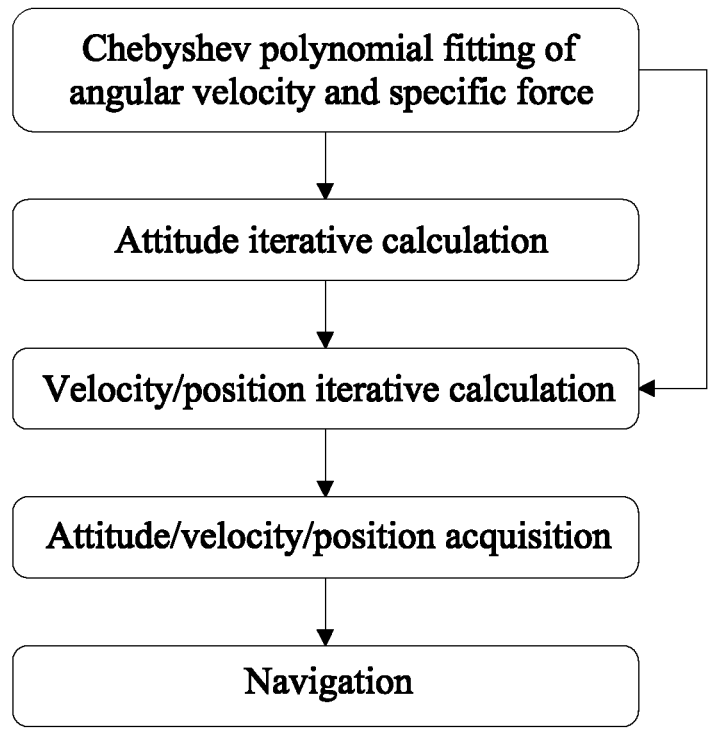
FIG. 1 is a solution flow chart of the present invention.
Figure 2:
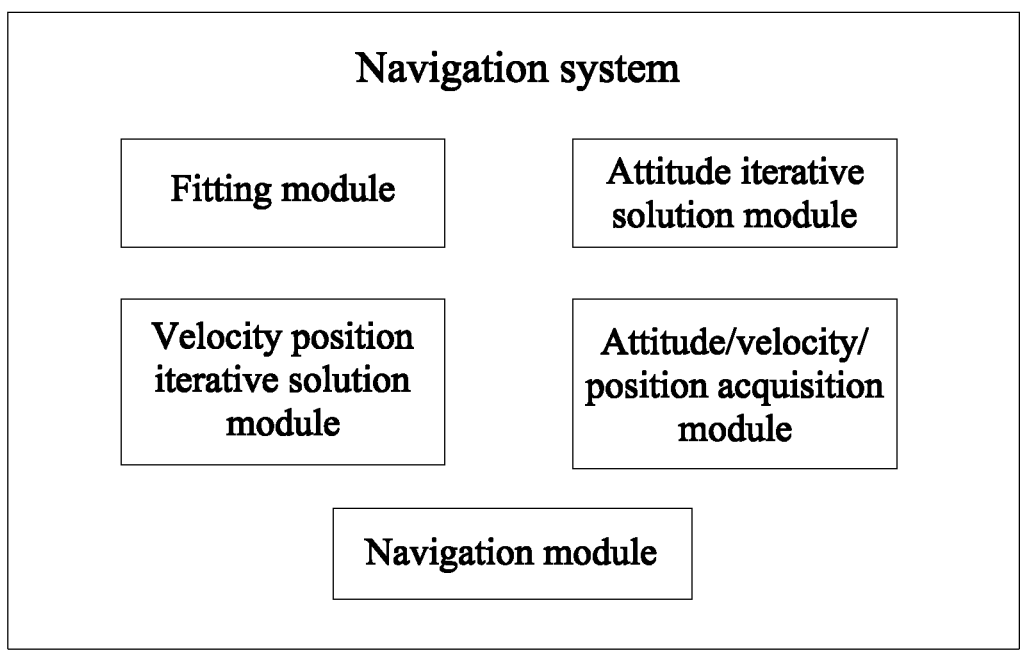
FIG. 2 is a diagram showing the navigation system of the present invention.

As shown in FIGS. 1 and 2, the present invention provides a function iterative integration-based method and system for inertial navigation solution. The method includes:

A fitting step: A Chebyshev polynomial function of an angular velocity and a Chebyshev polynomial function of a specific force are fitted according to gyroscope-measured values and accelerometer-measured values on a time interval. The gyroscope-measured values include a measured value of the angular velocity or a measured value of an angular increment. The accelerometer-measured values include a measured value of the specific force (non-gravitational acceleration) or a measured value of a velocity increment.

An attitude iterative solution step: Chebyshev polynomial coefficients of an attitude quaternion is iteratively calculated by using Chebyshev polynomial coefficients of the angular velocity obtained in the fitting step and an integral equation of the attitude quaternion, and polynomial truncation is performed on a result obtained from each iterative calculation according to a preset order. The attitude iterative process continues until the maximum number of iterative calculations is reached or the predetermined convergence condition is satisfied.

A velocity/position iterative solution step: Chebyshev polynomial coefficients of a velocity/position is iteratively calculated by using the Chebyshev polynomial coefficients of the specific force obtained in the fitting step, the Chebyshev polynomial coefficients of the attitude quaternion obtained in the attitude iterative solution step and an integral equation of the velocity/position, and polynomial truncation is performed on a result obtained from each iterative calculation according to a preset order. The velocity/position iterative process continues until the maximum number of iterative calculations is reached or the predetermined convergence condition is satisfied.

An attitude/velocity/position acquisition step: Attitude/velocity/position information on the corresponding time interval is obtained according to the obtained Chebyshev polynomial coefficients of the attitude/velocity/position and the corresponding Chebyshev polynomial.

A Chebyshev polynomial of a first type is defined on an interval [−1 1] and given by the following iterative relationship:

$$F_0(x)=1, F_1(x)=x, F_{i+1}(x)=2xF_i(x)-F_{i-1}(x);$$

wherein $F_i(x)$ represents the $i^{th}$ order Chebyshev polynomial of the first type.

Fitting step: The Chebyshev polynomial function of the angular velocity and the Chebyshev polynomial function of the specific force are fitted according to the gyroscope-measured values and the accelerometer-measured values on the time interval.

For the measured value $\tilde{\omega}_{t_k}$ of the angular velocity or the measured value $\Delta\tilde{\theta}_{t_k}$ of the angular increment obtained by N gyroscopes at $t_k$, and the measured value $\tilde{f}_{t_k}$ of the specific force or the measured value $\Delta\tilde{v}_{t_k}$ of the velocity increment obtained by N accelerometers, k=1,2, . . . N, let $$t = \frac{t_N}{2}(1+\tau),$$

wherein $\tau$ represents a mapped time variable, and the original time interval is mapped to [−1 1]. The angular velocity is approximately fitted by the following Chebyshev polynomials not exceeding N−1 order:

$$\hat{\omega}^b = \sum_{i=0}^{n_\omega} c_i F_i(\tau), n_\omega \leq N-1; \tag{1}$$

the specific force is approximately fitted by the following Chebyshev polynomials not exceeding N−1 order:

$$\hat{f}^b = \sum_{i=0}^{n_f} d_i F_i(\tau), n_f \leq N-1; \tag{2}$$

wherein $n_\omega$ and $n_f$ represent the order of the Chebyshev polynomial of the angular velocity and the order of the Chebyshev polynomial of the specific force, respectively; $c_i$ and $d_i$ represent a coefficient vector of the $i^{th}$ order Chebyshev polynomial of the angular velocity and a coefficient vector of the $i^{th}$ order Chebyshev polynomial of the specific force, respectively; and $\tau$ represents the mapped time variable.

For the angular velocity/specific force measurement, the coefficients $c_i$ and $d_i$ are determined by solving the following equations:

$$\Gamma(n_\omega)[c_0 \ c_1 \ \ldots \ c_{n_\omega}]^T = [\tilde{\omega}_{t_1} \ \tilde{\omega}_{t_2} \ \ldots \ \tilde{\omega}_{t_N}]^T \tag{3}$$

$$\Gamma(n_f)[d_0 \ d_1 \ \ldots \ d_{n_f}]^T = [\tilde{f}_{t_1} \ \tilde{f}_{t_2} \ \ldots \ \tilde{f}_{t_N}]^T;$$

for the angular increment/velocity increment measurement, the coefficients $c_i$ and $d_i$ are determined by solving the following equations:

$$\Theta(n_\omega)[c_0 \ c_1 \ \ldots \ c_{n_\omega}]^T = [\Delta\tilde{\theta}_{t_1} \ \Delta\tilde{\theta}_{t_2} \ \ldots \ \Delta\tilde{\theta}_{t_N}]^T \tag{4}$$

$$\Theta(n_f)[d_0 \ d_1 \ \ldots \ d_{n_f}]^T = [\Delta\tilde{v}_{t_1} \ \Delta\tilde{v}_{t_2} \ \ldots \ \Delta\tilde{v}_{t_N}]^T;$$

wherein the superscript T represents an operation of vector transpose or matrix transpose, and the matrices $\Gamma$ and $\Theta$ are defined as follows:

$$\Gamma(n) = \begin{bmatrix} 1 & F_1(\tau_1) & \ldots & F_n(\tau_1) \\ 1 & F_1(\tau_2) & \ldots & F_n(\tau_2) \\ \vdots & \vdots & \vdots & \vdots \\ 1 & F_1(\tau_N) & \ldots & F_n(\tau_N) \end{bmatrix}, \tag{5}$$

$$\Theta(n) = \begin{bmatrix} G_{0,[\tau_0 \ \tau_1]} & G_{1,[\tau_0 \ \tau_1]} & \cdots & G_{n,[\tau_0 \ \tau_1]} \\ G_{0,[\tau_1 \ \tau_2]} & G_{1,[\tau_1 \ \tau_2]} & \cdots & G_{n,[\tau_1 \ \tau_2]} \\ \vdots & \vdots & \vdots & \vdots \\ G_{0,[\tau_{N-1} \ \tau_N]} & G_{1,[\tau_{N-1} \ \tau_N]} & \cdots & G_{n,[\tau_{N-1} \ \tau_N]} \end{bmatrix};$$

wherein function $G_{i,[\tau_{k-1}\tau_k]}$ is defined as follows:

$$G_{i,[\tau_{k-1} \ \tau_k]} = \tag{6}$$

$$\begin{cases} \left(\frac{iF_{i+1}(\tau_k)}{i^2-1} - \frac{\tau_k F_i(\tau_k)}{i-1}\right) - \left(\frac{iF_{i+1}(\tau_{k-1})}{i^2-1} - \frac{\tau_{k-1}F_i(\tau_{k-1})}{i-1}\right), & i \neq 1 \\ \frac{\tau_k^2 - \tau_{k-1}^2}{2}, & i = 1 \end{cases}.$$

Attitude iterative solution step: The Chebyshev polynomial coefficients of the attitude quaternion is iteratively calculated by using the Chebyshev polynomial coefficients of the angular velocity obtained in the fitting step and an integral equation of the attitude quaternion, and polynomial truncation is performed on the result obtained from each iterative calculation according to a preset order.

Assuming that in the $l^{th}$ iterative calculation, the Chebyshev polynomial of the attitude quaternion is expressed as:

$$q_l = \sum_{i=0}^{m_q} b_{l,i} F_i(\tau); \tag{7}$$

wherein $m_q$ represents the predetermined truncation order, and $b_{l,i}$ represents the coefficient of the $i^{th}$ Chebyshev polynomial in the $l^{th}$ iterative calculation. When l=0, $q_0(t)=q(0)$, wherein q(0) represents the initial attitude quaternion. The Chebyshev polynomial coefficients of the attitude quaternion can be calculated iteratively as follows:

$$q_{l+1} = q(0) + \frac{t_N}{8} \tag{8}$$

$$\left(\sum_{i=0}^{m_q}\sum_{j=0}^{n_\omega} b_{l,i} \circ c_j (G_{i+j,[-1 \ \tau]} + G_{|i-j|,[-1 \ \tau]}) - 2\sum_{i=0}^{m_q} \omega_e \circ b_{l,i} G_{i,[-1 \ \tau]}\right)$$

$$= \sum_{i=0}^{m_q+m_\omega+1} b_{l+1,i} F_i(\tau) \xrightarrow{polynomial\ truncation} \sum_{i=0}^{m_q} b_{l+1,i} F_i(\tau),$$

until the convergence condition is satisfied or the preset maximum number of iterative calculations is reached. The convergence condition is set according to the Euclidean distance deviation between the Chebyshev polynomial coefficients of two iterative calculations, i.e., $$\left(\sum_{i=0}^{m_q} |b_{l+1,i} - b_{l,i}|^2\right)^{1/2}.$$

The final result obtained from iterative calculations of the attitude is expressed as $$q = \sum_{i=0}^{m_q} b_i F_i(\tau),$$

which is used as the input for the subsequent velocity and position calculation.

Velocity/position iterative solution step: The Chebyshev polynomial coefficients of the velocity/position is iteratively calculated by using the Chebyshev polynomial coefficients of the specific force obtained in the fitting step, the Chebyshev polynomial coefficients of the attitude quaternion obtained in the attitude iterative solution step and an integral equation of the velocity/position, and polynomial truncation is performed on a result obtained from each iterative calculation according to a preset order.

According to the Chebyshev polynomial of the specific force and the Chebyshev polynomial of the attitude quaternion, the integral of the specific force transformation is expressed as follows:

$$I_f(\tau) = \frac{1}{4} \sum_{i=0}^{m_q} \sum_{j=0}^{n_f} \sum_{k=0}^{m_q} b_i \circ d_j \circ \quad (9)$$

$$b_k^* (G_{i+j+k,[-1 \ \tau]} + G_{|i+j-k|,[-1 \ \tau]} + G_{|i+j|-k,[-1 \ \tau]} + G_{||i-j|-k|,[-1 \ \tau]}).$$

Assuming that in the $l^{th}$ iterative calculation, the Chebyshev polynomial of the velocity/position is expressed as follows:

$$v_l^e = \sum_{i=0}^{m_v} s_{l,i} F_i(\tau), \quad p_l^e = \sum_{i=0}^{m_p} \rho_{l,i} F_i(\tau); \quad (10)$$

wherein $m_v$ and $m_p$ represent the predetermined truncation order of the velocity and the predetermined truncation order of the position, respectively; $s_{l,i}$ and $\rho_{l,i}$ represent a coefficient of the $i^{th}$ Chebyshev polynomial of the velocity and a coefficient of the $i^{th}$ Chebyshev polynomial of the position in the $l^{th}$ iterative calculation, respectively. When $l=0$, $v_0^e(t) = v^e(0)$, $p_0^e(t) p^e(0)$, wherein $v^e(0)$ and $p^e(0)$ represent an initial velocity and an initial position, respectively.

Considering that the gravity model is generally given in the geographic coordinate system and gravity is a position-correlated nonlinear function, the gravity vector in the earth coordinate system is approximated by the Chebyshev polynomials as follows:

$$g^e(p_l^e) = C_n^e g^n \left( ecef2lla \left( \sum_{i=0}^{m_p} \rho_{l,i} F_i(\tau) \right) \right) \approx \sum_{i=0}^{m_g} \gamma_{l,i} F_i(\tau); \quad (11)$$

wherein $C_n^e$ represents an attitude matrix (also a position-correlated nonlinear function) of the earth coordinate system relative to the geographic coordinate system, $m_g$ represents the maximum order of the Chebyshev polynomial of gravity, and ecef2lla(·) represents a transformation from rectangular coordinates of the earth to geographic coordinates (longitude, latitude and altitude). The Chebyshev polynomial coefficient $\gamma_{l,i}$ of the gravity vector is calculated as follows:

$$\gamma_{l,i} \approx \qquad (12)$$

$$\frac{2 - \delta_{0i}}{P} \sum_{k=0}^{P-1} \cos \frac{i(k+1/2)\pi}{P} C_n^e g^n \left( ecef2lla \left( \sum_{i=0}^{m_p} \rho_{l,i} F_i \left( \cos \frac{(k+1/2)\pi}{P} \right) \right) \right);$$

wherein $\delta_{0i}$ represents the Kronecker delta function (when $i=1$, output 1; otherwise, output 0). The accuracy of approximation of gravity increases as the the number P of terms increases.

Formulas (9) and (12) are substituted to iteratively calculate the Chebyshev polynomial coefficients of the velocity/position as follows:

$$v_{l+1}^e = v^e(0) + \frac{t_N}{2} \left( I_f - 2 \sum_{i=0}^{m_v} \omega_e \times s_{l,i} G_{i,[-1 \ \tau]} + \sum_{i=0}^{m_g} \gamma_{l,i} G_{i,[-1 \ \tau]} \right) \quad (13)$$

$$= \sum_{i=0}^{\max\{2m_q+n_f, m_v, m_g\}+1} s_{l+1,i} F_i(\tau) \stackrel{polynomial \ truncation}{\approx} \sum_{i=0}^{m_v} s_{l+1,i} F_i(\tau),$$

$$p_{l+1}^e = p^e(0) + \frac{t_N}{2} \sum_{i=0}^{m_v} s_{l,i} G_{i,[-1 \ \tau]}$$

$$= \sum_{i=0}^{m_v+1} \rho_{l+1,i} F_i(\tau) \stackrel{polynomial \ truncation}{\approx} \sum_{i=0}^{m_p} \rho_{l+1,i} F_i(\tau)$$

until the convergence condition is satisfied or the preset maximum number of iterative calculations is reached.

The sequence of the velocity and the position in formula (13) can be reversed, and the velocity (position) result obtained from the same iterative calculation can be directly used in the subsequent position (velocity) calculation. For example, formula (13) can be calculated in the following sequence:

$$p_{l+1}^e = p^e(0) + \frac{t_N}{2} \sum_{i=0}^{m_v} s_{l,i} G_{i,[-1 \ \tau]} \quad (14)$$

$$= \sum_{i=0}^{m_v+1} \rho_{l+1,i} F_i(\tau) \stackrel{polynomial \ truncation}{\approx} \sum_{i=0}^{m_p} \rho_{l+1,i} F_i(\tau),$$

and $$v_{l+1}^e = v^e(0) + \frac{t_N}{2} \left( I_f - 2 \sum_{i=0}^{m_v} \omega_e \times s_{l,i} G_{i,[-1 \ \tau]} + \sum_{i=0}^{m_g} \gamma_{l,i} G_{i,[-1 \ \tau]} \right) \quad (15)$$

$$= \sum_{i=0}^{\max\{2m_q+n_f, m_v, m_g\}+1} s_{l+1,i} F_i(\tau) \stackrel{polynomial \ truncation}{\approx} \sum_{i=0}^{m_v} s_{l+1,i} F_i(\tau),$$

It should be noted that the gravity vector of formula (15) approximately uses position $p_{l+1}^e$ (corresponding to $\gamma_{l+1,i}$) calculated by formula (14) instead of $p_l^e$ in the previous iterative calculation.

Attitude/velocity/position acquisition step: The attitude/velocity/position information on the corresponding time interval is determined according to the obtained Chebyshev polynomial coefficients of the attitude/velocity/position and the corresponding Chebyshev polynomial.

With respect to the inertial navigation solution on a long time interval, the time interval can be divided into a plurality of sub-time intervals to perform sequential calculations.

Navigation step: Navigation is performed according to the attitude/velocity/position information on the corresponding time interval.

According to the above-mentioned functional iterative integration-based method for inertial navigation solution, the present invention further provides a functional iterative integration-based system for inertial navigation solution, which includes:

a fitting module, configured to fit a Chebyshev polynomial function of an angular velocity and a Chebyshev polynomial function of a specific force according to gyroscope-measured values and accelerometer-measured values on a time interval;

an attitude iterative solution module, configured to iteratively calculate Chebyshev polynomial coefficients of an attitude quaternion by using the obtained Chebyshev polynomial coefficients of the angular velocity and an integral equation of the attitude quaternion, and perform polynomial truncation on a result obtained from each iterative calculation according to a preset order;

a velocity/position iterative solution module, configured to iteratively calculate Chebyshev polynomial coefficients of a velocity/position by using the obtained Chebyshev polynomial coefficients of the specific force, the Chebyshev polynomial coefficients of the attitude quaternion and an integral equation of the velocity/position, and perform polynomial truncation on a result obtained from each iterative calculation according to a preset order; and an attitude/velocity/position acquisition module, configured to obtain attitude/velocity/position information on the corresponding time interval according to the obtained Chebyshev polynomial coefficients of the attitude/velocity/position and the corresponding Chebyshev polynomial.

Those skilled in the art shall understand that, in addition to implementing the system provided by the present invention and its various devices, modules, and units in a pure computer-readable program code manner, they may also be implemented to realize the same functions in the form of logic gates, switches, application-specific integrated circuits, programmable logic controllers, embedded microcontrollers, and the like, by performing logic programming on the steps of the method. Therefore, the system provided by the present invention and its various devices, modules and units can be regarded as hardware components, and the devices, modules, and units included in the system for implementing various functions can also be regarded as structures within the hardware components. Besides, the devices, modules, and units for realizing various functions can also be regarded as not only software modules but also the structures within the hardware components for implementing the method.

The specific embodiments of the present invention have been described above. It should be understood that the present invention is not limited to the foregoing specific embodiments. Those skilled in the art can make various changes or modifications within the scope of the claims without affecting the essence of the present invention. When not in conflict, the embodiments of the present invention and the features in the embodiments can be combined with each other arbitrarily.

What is claimed is:

1. A navigation method based on an inertial navigation solution, comprising:
    a fitting step: fitting a Chebyshev polynomial function of an angular velocity and a Chebyshev polynomial function of a specific force according to gyroscope-measured values and accelerometer-measured values on a time interval to obtain Chebyshev polynomial coefficients of the angular velocity and Chebyshev polynomial coefficients of the specific force;
    an attitude iterative solution step: iteratively calculating Chebyshev polynomial coefficients of an attitude quaternion by using the Chebyshev polynomial coefficients of the angular velocity and an integral equation of the attitude quaternion, and performing polynomial truncation on a result obtained from each iterative calculation of the Chebyshev polynomial coefficients of the attitude quaternion according to a first preset order;
    a velocity/position iterative solution step: iteratively calculating Chebyshev polynomial coefficients of a velocity/position by using the Chebyshev polynomial coefficients of the specific force, the Chebyshev polynomial coefficients of the attitude quaternion and an integral equation of the velocity/position, and performing polynomial truncation on a result obtained from each iterative calculation of the Chebyshev polynomial coefficients of the velocity/position according to a second preset order;
    an attitude/velocity/position acquisition step: obtaining attitude/velocity/position information on the time interval according to the Chebyshev polynomial coefficients of the velocity/position, the Chebyshev polynomial coefficients of the attitude quaternion and a Chebyshev polynomial corresponding to the velocity/position and the attitude quaternion; and
    a navigation step: performing a navigation according to the attitude/velocity/position information on the time interval.

2. The navigation method according to claim 1, wherein, the gyroscope-measured values comprise a measured value of the angular velocity or a measured value of an angular increment, and the accelerometer-measured values comprise a measured value of the specific force or a measured value of a velocity increment.

3. The navigation method according to claim 1, wherein, in the fitting step, the time interval is divided into at least two sub-time intervals to perform sequential calculations.

4. The navigation method according to claim 1, wherein, in the attitude iterative solution step or the velocity/position iterative solution step, the Chebyshev polynomial coefficients of the attitude quaternion or the Chebyshev polynomial coefficients of the velocity/position is iteratively calculated until a maximum number of iterative calculations is reached or a predetermined convergence condition is satisfied.

5. A navigation system based on an inertial navigation solution, comprising:
    a fitting module, wherein the fitting module is configured to fit a Chebyshev polynomial function of an angular velocity and a Chebyshev polynomial function of a specific force according to gyroscope-measured values and accelerometer-measured values on a time interval to obtain Chebyshev polynomial coefficients of the angular velocity and Chebyshev polynomial coefficients of the specific force;

an attitude iterative solution module, wherein the attitude iterative solution module is configured to iteratively calculate Chebyshev polynomial coefficients of an attitude quaternion by using the Chebyshev polynomial coefficients of the angular velocity and an integral equation of the attitude quaternion, and perform polynomial truncation on a result obtained from each iterative calculation of the Chebyshev polynomial coefficients of the attitude quaternion according to a first preset order;

a velocity/position iterative solution module, wherein the velocity/position iterative solution module is configured to iteratively calculate Chebyshev polynomial coefficients of a velocity/position by using the Chebyshev polynomial coefficients of the specific force, the Chebyshev polynomial coefficients of the attitude quaternion and an integral equation of the velocity/position, and perform polynomial truncation on a result obtained from each iterative calculation of the Chebyshev polynomial coefficients of the velocity/position according to a second preset order;

an attitude/velocity/position acquisition module, wherein the attitude/velocity/position acquisition module is configured to obtain attitude/velocity/position information on the time interval according to the Chebyshev polynomial coefficients of the velocity/position, the Chebyshev polynomial coefficients of the attitude quaternion and a Chebyshev polynomial corresponding to the velocity/position and the attitude quaternion; and a navigation module, wherein the navigation module is configured to perform a navigation according to the attitude/velocity/position information on the time interval.

6. The navigation system according to claim 5, wherein, the gyroscope-measured values comprise a measured value of the angular velocity or a measured value of an angular increment, and the accelerometer-measured values comprise a measured value of the specific force or a measured value of a velocity increment.

7. The navigation system according to claim 5, wherein, the fitting module divides the time interval into at least two sub-time intervals to perform sequential calculations.

8. The navigation system according to claim 5, wherein, the attitude iterative solution module and the velocity/position iterative solution module perform the each iterative calculation until a maximum number of iterative calculations is reached or a predetermined convergence condition is satisfied.

\* \* \* \* \*